(12) United States Patent
Asaura et al.

(10) Patent No.: US 10,221,741 B2
(45) Date of Patent: Mar. 5, 2019

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Shinya Asaura, Numazu (JP); Masaaki Sato, Susono (JP); Ryohei Ono, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 84 days.

(21) Appl. No.: 15/609,287

(22) Filed: May 31, 2017

(65) Prior Publication Data

US 2017/0350294 A1 Dec. 7, 2017

(30) Foreign Application Priority Data

Jun. 3, 2016 (JP) ................. 2016-111902

(51) Int. Cl.
*F01N 3/00* (2006.01)
*F01N 3/10* (2006.01)
(Continued)

(52) U.S. Cl.
CPC ............. *F01N 3/208* (2013.01); *F01N 3/035* (2013.01); *F01N 3/0807* (2013.01); *F01N 3/0842* (2013.01); *F01N 3/0885* (2013.01); *F01N 9/00* (2013.01); *F01N 9/002* (2013.01); *F01N 13/009* (2014.06); *F01N 3/0253* (2013.01); *F01N 3/103* (2013.01); *F01N 2610/02* (2013.01);
(Continued)

(58) Field of Classification Search
CPC .......... F01N 13/009; F01N 9/00; F01N 3/035; F01N 3/0807; F01N 3/0842; F01N 3/0885; F01N 3/208; F01N 3/0253; F01N 3/103; F01N 2610/02; F01N 2610/146; Y02T 10/24; Y02T 10/47
USPC ........... 60/274, 286, 295, 297, 299–301, 311
See application file for complete search history.

(56) References Cited

U.S. PATENT DOCUMENTS

| | | | |
|---|---|---|---|
| 2005/0069476 A1* | 3/2005 | Blakeman | B01D 53/9431 423/239.1 |
| 2016/0097312 A1* | 4/2016 | Nilsson | F01N 3/22 60/274 |
| 2017/0314440 A1* | 11/2017 | Minezawa | B01D 53/90 |

FOREIGN PATENT DOCUMENTS

JP 2013-113267 6/2013

* cited by examiner

*Primary Examiner* — Audrey K Bradley
*Assistant Examiner* — Dapinder Singh
(74) *Attorney, Agent, or Firm* — Finnegan, Henderson, Farabow, Garrett & Dunner, LLP

(57) ABSTRACT

An exhaust gas control apparatus has an exhaust gas control element other than an SCR catalyst. A temperature increase treatment unit executes temperature increase treatment that increases temperature of exhaust gas flowing into the exhaust gas control apparatus so as to increase the temperature of the exhaust gas control element to a specified target temperature. In this case, when operation of the internal combustion engine is stopped while the temperature increase treatment unit is not executing the temperature increase treatment, addition of an additive to the SCR catalyst from an addition valve is executed after operation stop of the internal combustion engine. When operation of the internal combustion engine is stopped while the temperature increase treatment unit is executing the temperature increase treatment, addition of the additive to the SCR catalyst from the addition valve is not executed after operation stop of the internal combustion engine.

4 Claims, 9 Drawing Sheets

(51) Int. Cl.
*F01N 9/00* (2006.01)
*F01N 3/20* (2006.01)
*F01N 3/035* (2006.01)
*F01N 3/08* (2006.01)
*F01N 13/00* (2010.01)
*F01N 3/025* (2006.01)

(52) U.S. Cl.
CPC ......... *F01N 2610/146* (2013.01); *Y02T 10/24* (2013.01); *Y02T 10/47* (2013.01)

EXHAUST GAS CONTROL SYSTEM FOR INTERNAL COMBUSTION ENGINE

INCORPORATION BY REFERENCE

The disclosure of Japanese Patent Application No. 2016-111902 filed on Jun. 3, 2016 including the specification, drawings and abstract is incorporated herein by reference in its entirety.

BACKGROUND

1. Technical Field

The present disclosure relates to an exhaust gas control system for an internal combustion engine.

2. Description of Related Art

Conventionally, an exhaust gas control system configured to include a selective reduction NOx catalyst (which may also be referred to as an "SCR catalyst" below) in an exhaust passage of an internal combustion engine is known. The SCR catalyst has a function to selectively reduce NOx in exhaust gas with ammonia as a reducing agent. In such an exhaust gas control system, an additive that is ammonia or a precursor of ammonia is added from an addition valve provided in the exhaust passage. Accordingly, ammonia is supplied to the SCR catalyst, so that NOx in exhaust gas is reduced in the SCR catalyst by using ammonia as a reducing agent.

Japanese Patent Application Publication No. 2013-113267 discloses an exhaust gas control system configured to include an addition valve provided in an exhaust passage upstream from the SCR catalyst for adding urea water (i.e., aqueous solution of urea that is a precursor of ammonia). In the exhaust gas control system, a technique for adding urea water from the addition valve after operation stop of the internal combustion engine is disclosed.

SUMMARY

In some of the exhaust gas control systems including the SCR catalyst, the addition valve that adds an additive that is ammonia or a precursor of ammonia may be provided in the exhaust passage such that the additive is added toward the SCR catalyst. In the exhaust gas control systems having such a configuration, the additive may be added from the addition valve after operation stop of the internal combustion engine.

In the above configuration, when an additive is added from the addition valve, ammonia is supplied to the SCR catalyst even after the operation stop of the internal combustion engine (i.e., in the state where exhaust gas does not flow through the exhaust passage). Therefore, ammonia is adsorbed onto the SCR catalyst after the operation stop of the internal combustion engine. The ammonia adsorbed to the SCR catalyst is used for reduction of NOx in the SCR catalyst immediately after restart of the internal combustion engine (immediately after the SCR catalyst is activated after the start of the internal combustion engine in the case where the internal combustion engine is started with the SCR catalyst being inactive). Accordingly, it becomes possible to enhance a NOx purification rate with the SCR catalyst (a ratio of the quantity of NOx reduced in the SCR catalyst to the quantity of NOx flowing into the SCR catalyst) immediately after the restart of the internal combustion engine.

However, in addition to the SCR catalyst, an exhaust gas control element having an exhaust gas control function different from the SCR catalyst may be provided in the exhaust passage. In the configuration having the exhaust gas control element provided in the exhaust passage, temperature increase treatment for increasing the temperature of the exhaust gas control element may be executed for such a purpose as recovery of the exhaust gas control function of the exhaust gas control element. In this case, not only the temperature of the exhaust gas control element but also the temperature of the SCR catalyst may increase with execution of the temperature increase treatment. In such a case, when the temperature increase treatment is executed immediately after the restart of the internal combustion engine, it causes abrupt temperature rise of the SCR catalyst. If ammonia is adsorbed to the SCR catalyst at that time, the ammonia may be desorbed from the SCR catalyst without being used for reduction of NOx, and be discharged to the atmosphere.

The present disclosure reduces the quantity of ammonia discharged into the atmosphere, while achieving enhancement in the NOx purification rate in the SCR catalyst immediately after start of the internal combustion engine.

An exhaust gas control system for an internal combustion engine according to the present embodiment is an exhaust gas control apparatus provided in an exhaust passage of the internal combustion engine, including:

an exhaust gas control apparatus having a selective reduction NOx catalyst having a function to selectively reduce NOx in exhaust gas with ammonia as a reducing agent and an exhaust gas control element having an exhaust gas control function different from the selective reduction NOx catalyst; an addition valve provided in the exhaust passage, the addition valve being configured to add an additive that is ammonia or a precursor of ammonia toward the selective reduction NOx catalyst; an addition control unit that controls addition of the additive from the addition valve; and a temperature increase treatment unit configured to, when a specified temperature increase execution condition is satisfied, execute temperature increase treatment that increases temperature of the exhaust gas flowing into the exhaust gas control apparatus so as to increase temperature of the exhaust gas control element to a specified target temperature, the temperature increase treatment unit being configured to, when operation of the internal combustion engine is stopped during execution of the temperature increase treatment, interrupt the temperature increase treatment, and then resume the temperature increase treatment when the internal combustion engine is restarted. When operation of the internal combustion engine is stopped while the temperature increase treatment unit does not execute the temperature increase treatment, the additive control unit executes addition of the additive from the addition valve after operation stop of the internal combustion engine, and when operation of the internal combustion engine is stopped during execution of the temperature increase treatment by the temperature increase treatment unit, the temperature increase treatment unit interrupts the temperature increase treatment, and the addition control unit does not execute addition of the additive from the addition valve after operation stop of the internal combustion engine. The present embodiment may also be defined as follows. An exhaust gas control system includes: an exhaust gas control apparatus provided in an exhaust passage of an internal combustion engine, the exhaust gas control apparatus including a selective reduction NOx catalyst having a function to selectively reduce NOx in exhaust gas with ammonia as a reducing agent, and an exhaust gas control element having an exhaust gas control function different from the selective reduction NOx catalyst; an addition valve provided in the exhaust passage, the addition valve being configured to add one of an additive that is ammonia and a precursor of ammonia toward the selective reduction NOx catalyst; and an electronic control unit configured to: i) when a specified temperature increase execution condition is satisfied, execute temperature increase treatment that increases temperature of the exhaust gas flowing into the exhaust gas control apparatus such that a temperature of the exhaust gas control element increases to a specified target temperature, ii) when operation of the internal combustion engine is stopped during execution of the temperature increase treatment, interrupt the temperature increase treatment, and then resume the temperature increase treatment when the internal combustion engine is restarted, iii) when operation of the internal combustion engine is stopped while the temperature increase treatment is not executed, execute addition of the additive from the addition valve after operation stop of the internal combustion engine, and iv) when operation of the internal combustion engine is stopped during execution of the temperature increase treatment, prohibits execution of addition of the additive from the addition valve after operation stop of the internal combustion engine.

In the present disclosure, the exhaust gas control apparatus has an exhaust gas control element other than the SCR catalyst. The exhaust gas control apparatus may be configured such that the exhaust gas control element carries the SCR catalyst. When a specified temperature increase execution condition is satisfied, the temperature increase treatment unit executes the temperature increase treatment for increasing the temperature of the exhaust gas control element. The temperature increase execution condition is preset in accordance with types of the exhaust gas control element. Here, when the temperature increase treatment unit executes the temperature increase treatment, the temperature of the exhaust gas flowing into the exhaust gas control apparatus increases. Accordingly, not only the temperature of the exhaust gas control element but also the temperature of the SCR catalyst inevitably increases. When operation of the internal combustion engine is stopped during execution of the temperature increase treatment by the temperature increase treatment unit, the temperature increase treatment is interrupted, and when the internal combustion engine is restarted, the temperature increase treatment is resumed. In this case, the temperature of the SCR catalyst rapidly increases immediately after start of the internal combustion engine, and the temperature of the SCR catalyst can be higher than that in normal time (i.e., the time when temperature increase treatment is not executed). Therefore, in such a case, when the additive is added from the addition valve to the SCR catalyst after stop of the internal combustion engine, ammonia is adsorbed onto the SCR catalyst. Accordingly, the ammonia tends to be desorbed from the SCR catalyst and be discharged into the atmosphere without being used for reduction of NOx when the temperature increase treatment is resumed after the restart of the internal combustion engine.

Accordingly, in the present embodiment, when operation of the internal combustion engine is stopped while the temperature increase treatment unit is not executing the temperature increase treatment, the addition control unit executes addition of the additive from the addition valve after the operation stop of the internal combustion engine. This makes it possible to enhance the NOx purification rate in the SCR catalyst immediately after start of the internal combustion engine. In the case where operation of the internal combustion engine is stopped while the temperature increase treatment unit is executing the temperature increase treatment, the addition control unit does not execute addition of the additive from the addition valve after the operation stop of the internal combustion engine. In this case, ammonia is not adsorbed onto the SCR catalyst after operation stop of the internal combustion engine. Therefore, it becomes possible to reduce the quantity of ammonia desorbed from the SCR catalyst in the case where the temperature of the SCR catalyst rapidly increases due to resumption of the temperature increase treatment by the temperature increase treatment unit immediately after start of the internal combustion engine. This makes it possible to reduce the quantity of ammonia discharged into the atmosphere immediately after start of the internal combustion engine.

In the present embodiment, when a sufficient quantity of ammonia is adsorbed onto the SCR catalyst at the moment when operation of the internal combustion engine is stopped, it is not necessary to add the additive from the addition valve after the operation stop of the internal combustion engine. Accordingly, in the present embodiment, in the case where operation of the internal combustion engine is stopped while the temperature increase treatment is not executed by the temperature increase treatment unit, whether or not to execute addition of the additive from the addition valve after the operation stop of the internal combustion engine may be determined based on the quantity of ammonia adsorbed onto the SCR catalyst at the moment when the operation of the internal combustion engine is stopped. That is, when the quantity of ammonia adsorbed onto the SCR catalyst at the moment when the internal combustion engine is stopped is less than a specified target adsorption quantity, the addition control unit may execute addition of the additive from the addition valve after the operation stop of the internal combustion engine. When the quantity of ammonia adsorbed onto the SCR catalyst at the moment when operation of the internal combustion engine is stopped is equal to or more than the target adsorption quantity, the addition control unit may prohibit execution of addition of the additive from the addition valve after the operation stop of the internal combustion engine. Here, the target adsorption quantity may be defined as an adsorption quantity of ammonia considered to be necessary for sufficient reduction of NOx in the SCR catalyst immediately after restart of the internal combustion engine. Such control can suppress unnecessary addition of the additive from the addition valve.

In the present embodiment, the exhaust gas control element may be a fitter having a function to collect particulates in the exhaust gas. In this case, the temperature increase treatment executed by the temperature increase treatment unit may be filter regeneration treatment that oxidizes and removes the particulates accumulated on the filter. The temperature increase execution condition may be an execution condition of the filter regeneration treatment.

In the present embodiment, the exhaust gas control element may be an occlusion reduction NOx catalyst. In this case, the temperature increase treatment executed by the temperature increase treatment unit may be SOx poisoning recovery treatment that recovers the occlusion reduction NOx catalyst from SOx poisoning. The temperature increase execution condition may be an execution condition of the SOx poisoning recovery treatment.

According to the present disclosure, it becomes possible to reduce the quantity of ammonia discharged into the atmosphere, while achieving enhancement in the NOx purification rate in the SCR catalyst immediately after start of the internal combustion engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Specific embodiments of the present disclosure will be described hereinbelow with reference to the accompanying drawings. Note that sizes, materials, shapes, and relative arrangements of component members disclosed in the embodiments are not intended to restrict the technical scope of the present disclosure thereto unless otherwise specified.

First Embodiment

Figure 1:
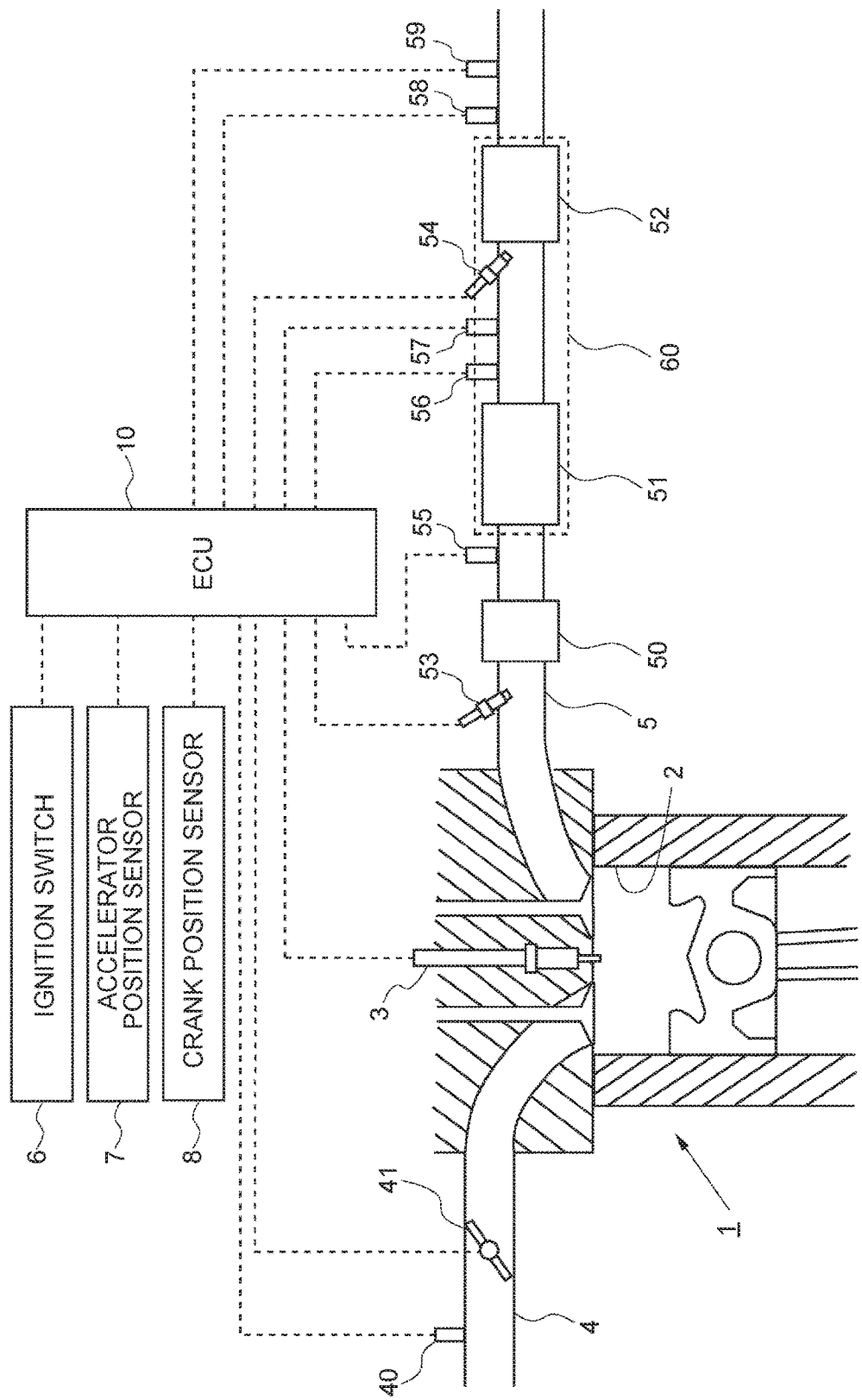
FIG. 1 illustrates a schematic configuration of an internal combustion engine and an intake and exhaust system thereof according to a first embodiment.

FIG. 1 illustrates a schematic configuration of an internal combustion engine and an intake and exhaust system thereof according to the present embodiment. The internal combustion engine 1 illustrated in FIG. 1 is a compression ignition type internal combustion engine (diesel engine) that uses gas oil as fuel. However, the present disclosure is also applicable to a spark ignition type internal combustion engine that uses fuel such as gasoline.

The internal combustion engine 1 includes a fuel injection valve 3 that injects fuel into a cylinder 2. When the internal combustion engine 1 is a spark ignition type internal combustion engine, the fuel injection valve 3 may be configured to inject fuel to an inlet port.

The internal combustion engine 1 is connected to an intake passage 4. The intake passage 4 is provided with an air flowmeter 40 and a throttle valve 41. The air flowmeter 40 outputs an electrical signal corresponding to the quantity (mass) of intake gas (air) flowing through the intake passage 4. The throttle valve 41 is disposed downstream from the air flowmeter 40 in the intake passage 4. The throttle valve 41 changes the sectional area of the passage in the intake passage 4 to regulate the quantity of air taken into the internal combustion engine 1.

The internal combustion engine 1 is connected to an exhaust passage 5. The exhaust passage 5 is provided with an oxidation catalyst 50, a filter 51, an SCR catalyst 52, a fuel addition valve 53, and a urea water addition valve 54. The filter 51 is a wall-flow type filter formed with a porous substrate, with a function to collect PM in exhaust gas. The SCR catalyst 52 has a function to reduce NOx in exhaust gas by using ammonia as a reducing agent. The oxidation catalyst 50 is provided in a portion of the exhaust passage 5 upstream from the filter 51. Hereinafter, the filter 51 and the SCR catalyst 52 may integrally be referred to as an exhaust gas control apparatus 60.

In the present embodiment, the filter 51 corresponds to "the exhaust gas control element", and the SCR catalyst 52 corresponds to "the selective reduction NOx catalyst." In the present embodiment, the exhaust gas control apparatus 60 constituted of the filter 51 and the SCR catalyst 52 corresponds to "the exhaust gas control apparatus." The present embodiment may adopt a configuration in which the filter 51 carries the SCR catalyst 52.

The fuel addition valve 53 is provided in a portion of the exhaust passage 5 further upstream from the oxidation catalyst 50. The fuel addition valve 53 adds fuel to the exhaust gas which flows through the inside of the exhaust passage 5. The urea water addition valve 54 is provided in a portion of the exhaust passage 5 immediately upstream from the SCR catalyst 52. The urea water addition valve 54 adds urea water toward the SCR catalyst 52. That is, the urea water addition valve 54 is disposed such that the added urea water reaches the SCR catalyst 52 even when exhaust gas does not flow through the exhaust passage 5. When urea water is added from the urea water addition valve 54, the urea water is hydrolyzed into ammonia. As a result, the ammonia is supplied to the SCR catalyst 52. In the SCR catalyst 52, NOx in exhaust gas is reduced by using the ammonia as a reducing agent.

In the present embodiment, the urea water addition valve 54 corresponds to "the addition valve." In the present embodiment, the urea water addition valve 54 may be replaced with an ammonia addition valve that adds ammonia gas toward the SCR catalyst 52. In this case, the ammonia addition valve corresponds to "the addition valve."

In a portion of the exhaust passage 5 downstream from the oxidation catalyst 50 and upstream from the filter 51, an $O_2$ sensor 55 is provided. The $O_2$ sensor 55 outputs an electrical signal corresponding to $O_2$ concentration of the exhaust gas. In a portion of the exhaust passage 5 downstream from the filter 51 and upstream from the urea water addition valve 54, an upstream temperature sensor 56 and an upstream NOx sensor 57 are provided. In a portion of the exhaust passage 5 downstream from the SCR catalyst 52, a downstream temperature sensor 58 and a downstream NOx sensor 59 are provided. The upstream temperature sensor 56 and the downstream temperature sensor 58 output electrical signals corresponding to the temperature of the exhaust gas. The upstream NOx sensor 57 and the downstream NOx sensor 59 output electrical signals corresponding to NOx concentration of the exhaust gas.

The internal combustion engine 1 is annexed with an electronic control unit (ECU) 10. The ECU 10 is a unit having a processor that controls the operating state and the like of the internal combustion engine 1. The ECU 10 is electrically connected to various sensors, such as the air flowmeter 40, the $O_2$ sensor 55, the upstream temperature sensor 56, the upstream NOx sensor 57, the downstream temperature sensor 58, and the downstream NOx sensor 59, as well as an ignition switch 6, an accelerator position sensor 7, and a crank position sensor 8. The accelerator position sensor 7 is a sensor that outputs an electrical signal corresponding to the operation amount (accelerator opening) of an accelerator pedal of a vehicle incorporating the internal combustion engine 1. The crank position sensor 8 is a sensor that outputs an electrical signal corresponding to the rotational position of an engine output shaft (crankshaft) of the internal combustion engine 1. The output signals of these sensors are input into the ECU 10.

The ECU 10 estimates the flow rate of exhaust gas (which may also be referred to as "exhaust gas flow rate") flowing through the exhaust passage 5 based on the output value of the air flowmeter 40. The ECU 10 estimates the temperature of the filter 51 (which may also be referred to as "filter temperature") based on the output value of the upstream temperature sensor 56. The ECU 10 also estimates the temperature of the SCR catalyst 52 (which may also be referred to as "SCR temperature") based on the output value of the downstream temperature sensor 58.

The ECU 10 is also electrically connected to various devices such as the fuel injection valve 3, the throttle valve 41, the fuel addition valve 53, and the urea water addition valve 54. The ECU 10 controls the various devices based on the output signal of each sensor as described before.

Filter Regeneration Treatment

In the present embodiment, the ECU 10 repeatedly computes a PM accumulation quantity (which may also be referred to as "filter PM accumulation quantity") in the filter 51 at predetermined periods during operation of the internal combustion engine 1. In this computation, a PM collection quantity that is the quantity of PM collected with the filter 51 and a PM oxidation quantity that is the quantity of PM oxidized in the filter 51 are integrated to calculate a current filter PM accumulation quantity. The PM collection quantity can be calculated by multiplying a specified PM collection efficiency (a ratio of the quantity of PM collected with the filter 51 to the quantity of PM flowing into the filter 51) by the quantity of PM discharged from the internal combustion engine 1 estimated based on the operating state of the internal combustion engine 1. The PM oxidation quantity can be calculated based on the filter temperature, $O_2$ concentration of the exhaust gas detected by the $O_2$ sensor 55 (i.e., $O_2$ concentration of the exhaust gas flowing into the filter 51), and the filter PM accumulation quantity (which may also be referred to as "accumulation quantity previous value") calculated in the previous computation. Then, the PM collection quantity that is an increment is added to the previous accumulation value, and a PM oxidation quantity that is a decrement is subtracted from the previous accumulation value to calculate a present filter PM accumulation quantity (current filter PM accumulation quantity).

In the present embodiment, when the filter PM accumulation quantity calculated as described above reaches a first specified accumulation quantity, the ECU 10 executes the filter regeneration treatment. The filter regeneration treatment is implemented by adding fuel from the fuel addition valve 53. When the fuel is added from the fuel addition valve 53, the fuel is oxidized in the oxidation catalyst 50. Oxidation heat generated by the oxidation increases the temperature of the exhaust gas flowing into the exhaust gas control apparatus 60, that is, the temperature of the exhaust gas flowing into the filter 51. With increase in the exhaust-gas temperature, the filter temperature increases. At this time, the quantity of fuel added from the fuel addition valve 53 is regulated so that the filter temperature becomes a specified filter regeneration temperature. Here, the filter regeneration temperature is the temperature in the range where the PM accumulated on the filter 51 can be oxidized and overheating of the filter 51 can be suppressed. This filter regeneration temperature is preset based on an experiment and the like, and stored in the ECU 10. When the temperature of the filter 51 is increased to a filter regeneration temperature, the PM accumulated on the filter 51 is oxidized and removed.

Then, when the filter PM accumulation quantity decreases to a second specified accumulation quantity after start of execution of the filter regeneration treatment, the ECU 10 stops the filter regeneration treatment. Here, the second specified accumulation quantity is smaller than the first specified accumulation quantity, and is usable as an indication indicating sufficient decrease in the filter PM accumulation quantity. The first specified accumulation quantity and the second specified accumulation quantity are preset based on an experiment and the like, and are stored in the ECU 10. In the internal combustion engine 1, instead of fuel addition from the fuel addition valve 53, sub fuel injection (post injection) from the fuel injection valve 3 may be performed to supply fuel to the oxidation catalyst 50 at the timing subsequent to main fuel injection, so that the filter regeneration treatment may be implemented.

In some cases, operation of the internal combustion engine 1 is stopped during execution of the filter regeneration treatment. In such a case, the ECU 10 interrupts the filter regeneration treatment. That is, the filter regeneration treatment is stopped before the filter PM accumulation quantity decreases to the second specified accumulation quantity. In such a case, when the internal combustion engine 1 is restarted, the ECU 10 resumes the filter regeneration treatment. In short, the filter regeneration treatment is executed even in the state where the filter PM accumulation quantity is smaller than the first specified accumulation quantity. Also in this case, when the filter PM accumulation quantity decreases to the second specified accumulation quantity, the filter regeneration treatment is stopped.

Here, the flow of the filter regeneration treatment according to the present embodiment will be described with reference to the flowchart illustrated in FIG. 2. The flow is prestored in the ECU 10, and is executed by the ECU 10 during operation of the internal combustion engine 1 (including start time and stop time of the internal combustion engine 1).

In this flow, first, it is determined in S101 whether or not the filter regeneration flag stored in the ECU 10 is turned OFF. Here, the filter regeneration flag is turned ON when a condition to execute the filter regeneration treatment is satisfied, and turned OFF when the condition to execute the filter regeneration treatment is not satisfied. As described in the foregoing, when operation of the internal combustion engine 1 is stopped during execution of the filter regeneration treatment, the filter regeneration treatment is interrupted. However, in this case, the filter regeneration flag stored in the ECU 10 is maintained to be turned ON. Therefore, if positive determination is made in S101, i.e., the filter regeneration flag stored in the ECU 10 is turned OFF when the flow is first executed at the start of the internal combustion engine 1, it can be determined that the filter regeneration treatment was not executed when operation of the internal combustion engine 1 was previously stopped. In this case, processing of S102 is executed next.

Here, as described in the foregoing, in the present embodiment, the ECU 10 periodically computes the filter PM accumulation quantity during operation of the internal combustion engine 1. The filter PM accumulation quantity stored in the ECU 10 is updated for each computation. In S102, a filter PM accumulation quantity Qpm stored in the ECU 10, i.e., a current filter PM accumulation quantity Qpm is read.

Next, in S103, it is determined whether or not the filter PM accumulation quantity Qpm read in S102 is equal to or more than a first specified accumulation quantity Qpm1 that is a threshold to start execution of the filter regeneration treatment. When positive determination is made in S103, then the filter regeneration flag stored in the ECU 10 is turned ON in S104. Then, in S105, the filter regeneration treatment is executed. That is, fuel addition from the fuel addition valve 53 is executed, and the filter temperature is controlled to be a filter regeneration temperature.

If negative determination is made in S101, i.e., the filter regeneration flag stored in the ECU 10 is turned ON when the flow is first executed at the start of the internal combustion engine 1, it can be determined that the filter regeneration treatment was interrupted when operation of the internal combustion engine 1 was previously stopped. In this case, processing of S105 is executed without going through processing of S102 to S104. That is, even in the state where the filter PM accumulation quantity Qpm at the present moment is less than the first specified accumulation quantity Qpm1, the filter regeneration treatment is still resumed.

After the processing of S105, processing of S106 is executed. In S106, the current filter PM accumulation quantity Qpm stored in the ECU 10 is read. Periodic computation of the filter PM accumulation quantity by the ECU 10 is performed even during execution of the filter regeneration treatment. In S106, the current filter PM accumulation quantity Qpm during execution of the filter regeneration treatment is read.

Next, in S107, it is determined whether or not the filter PM accumulation quantity Qpm read in S106 is equal to or less than a second specified accumulation quantity Qpm2 that is a threshold to stop execution of the filter regeneration treatment. More specifically, it is determined whether or not the filter PM accumulation quantity Qpm has decreased to the second specified accumulation quantity Qpm2 or less by the execution of the filter regeneration treatment. When positive determination is made in S107, then the filter regeneration flag stored in the ECU 10 is turned OFF in S108. Then, in S109, the filter regeneration treatment is stopped. That is, fuel addition from the fuel addition valve 53 is stopped. Then, execution of the flow is temporarily ended.

Meanwhile, when negative determination is made in S107 i.e., when the filter PM accumulation quantity Qpm does not yet decrease to the second specified accumulation quantity Qpm2, then processing of S110 is executed. In S110, it is determined whether or not the ignition switch 6 is turned OFF (IG OFF), i.e., whether or not operation of the internal combustion engine 1 is stopped. When negative determination is made in S110, i.e., when the operation of the internal combustion engine 1 continues, then the processing of S105 to S107 is executed again. That is, execution of the filter regeneration treatment is continued. On the contrary, when positive determination is made in S110, then processing of S109 is executed. That is, in the state where the filter PM accumulation quantity Qpm is more than the second specified accumulation quantity Qpm2, the filter regeneration treatment is interrupted. In this case, the filter regeneration flag stored in the ECU 10 is maintained to be turned ON as described before. Then, execution of the flow is ended.

When negative determination is made in S103, i.e., when the filter PM accumulation quantity does not yet reach the first specified accumulation quantity Qpm1 during operation of the internal combustion engine 1, the filter regeneration flag stored in the ECU 10 is then maintained to be turned OFF in S111. Then, execution of the flow is temporarily ended. In this case, when the flow is executed next time, positive determination will be made in S101.

Figure 2:
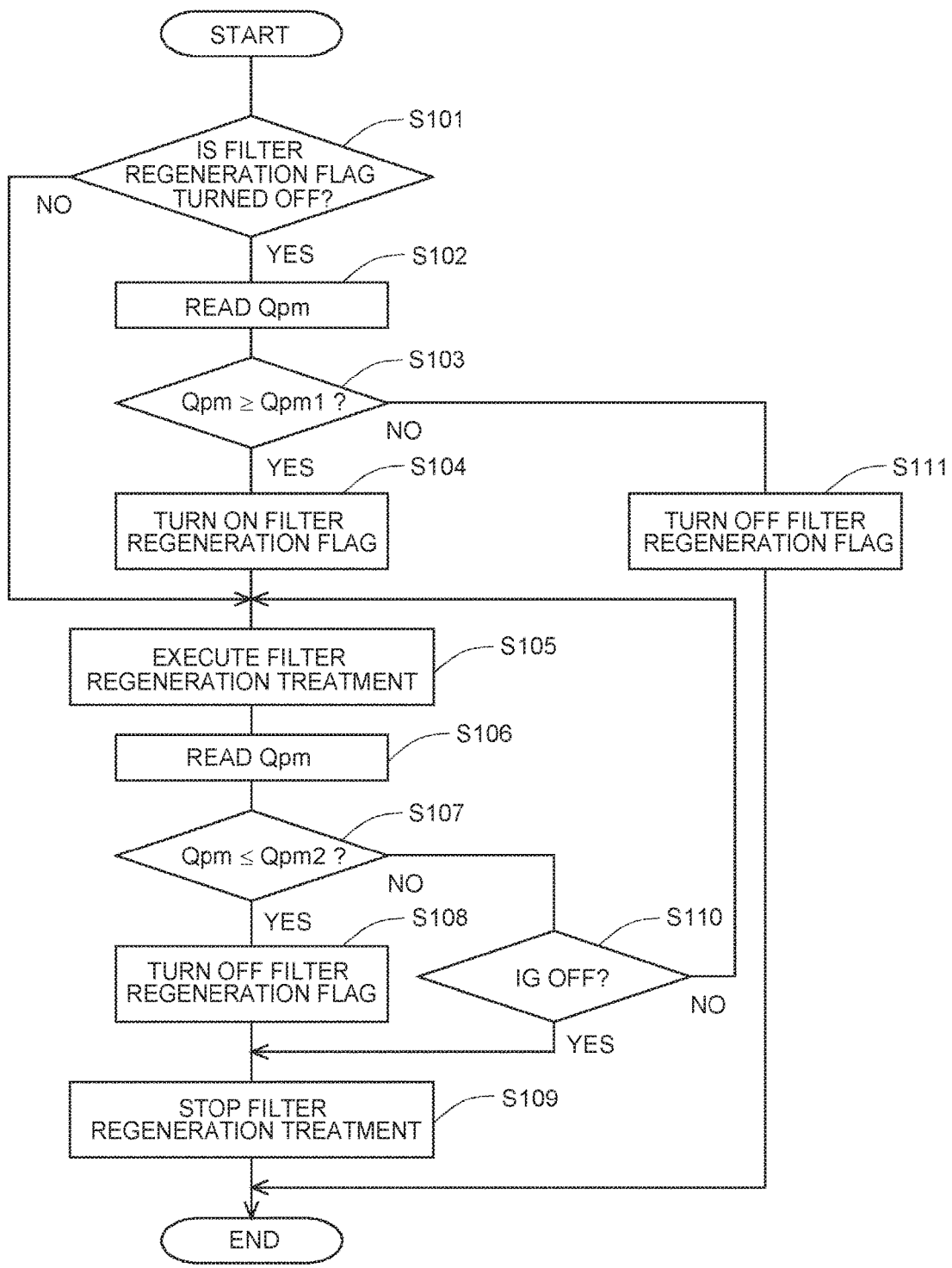
FIG. 2 is a flowchart illustrating a flow of filter regeneration treatment according to the first embodiment.

According to the flow illustrated in FIG. 2, when operation of the internal combustion engine 1 is stopped during execution of the filter regeneration treatment, the filter regeneration treatment is interrupted, and then when the internal combustion engine 1 is restarted, the filter regeneration treatment is resumed.

In the present embodiment, the filter regeneration treatment corresponds to "the temperature increase treatment." In the present embodiment, "the temperature increase treatment unit" is implemented by the ECU 10 executing the flow illustrated in FIG. 2.

Urea Water Addition Control

A description is now given of urea water addition control according to the present embodiment. As described in the foregoing, in the present embodiment, ammonia is supplied to the SCR catalyst 52 by adding urea water from the urea water addition valve 54. The ammonia is then adsorbed onto the SCR catalyst 52. In the present embodiment, the ECU 10 repeatedly computes the quantity of ammonia adsorbed onto SCR catalyst 52 (which may also simply be referred to as "ammonia adsorption quantity") at predetermined periods during operation of the internal combustion engine 1. In the computation, a current ammonia adsorption quantity is calculated by integrating an ammonia supply quantity that is the quantity of ammonia supplied to the SCR catalyst 52, an ammonia consumption quantity that is the quantity of ammonia consumed by reduction of NOx in the SCR catalyst 52, and an ammonia desorption quantity that is the quantity of ammonia desorbed from the SCR catalyst 52. The ammonia supply quantity is calculable based on the quantity of urea water added from the urea water addition valve 54. The ammonia consumption quantity is calculable based on the NOx concentration in the exhaust gas detected by the upstream NOx sensor 57 (i.e., NOx concentration in the exhaust gas flowing into the SCR catalyst 52), the exhaust gas flow rate, the SCR temperature, and the quantity of ammonia adsorbed onto the SCR catalyst 52 calculated in the previous computation (which may also be referred to as "adsorption quantity previous value" below). More specifically, the NOx purification rate of the SCR catalyst 52 at a current time point can be estimated based on the exhaust gas flow rate, the SCR temperature, and the adsorption quantity previous value. Furthermore, the quantity of NOx flowing into the SCR catalyst 52 can be estimated based on the NOx concentration in the exhaust gas flowing into the SCR catalyst 52 and on the exhaust gas flow rate. Based on these estimated values, the ammonia consumption quantity can be calculated. The ammonia desorption quantity is calculable based on the SCR temperature and the adsorption quantity previous value. The present ammonia adsorption quantity (the current ammonia adsorption quantity) is calculated by adding to the adsorption quantity previous value the ammonia supply quantity that is an increment and by subtracting from the adsorption quantity previous value the ammonia consumption quantity and the ammonia desorption quantity that are decrements.

In the present embodiment, during operation of the internal combustion engine 1, the ECU 10 normally controls the urea water addition quantity from the urea water addition valve 54 such that the ammonia adsorption quantity calculated as described above is maintained or regulated to be a specified target adsorption quantity. Here, the specified target adsorption quantity is a value predetermined based on an experiment and the like as a value that can secure a desired NOx purification rate in the SCR catalyst 52 and that can keep the quantity of ammonia, which is desorbed from the SCR catalyst 52 and discharged into the atmosphere, in an allowable range.

However, immediately after the start of the internal combustion engine 1 (immediately after the SCR catalyst 52 is activated after the start of the internal combustion engine 1 in the case where the internal combustion engine 1 is started with the SCR catalyst 52 being inactive), it may take a certain amount of time before the quantity of ammonia adsorbed onto the SCR catalyst 52 reaches a target adsorption quantity. In such a case, it may become difficult to secure a desired NOx purification rate in the SCR catalyst 52 immediately after start of the internal combustion engine 1. Accordingly, in the present embodiment, addition of the urea water from the urea water addition valve 54 is executed after operation stop of the internal combustion engine 1.

As described in the foregoing, in the present embodiment, the urea water addition valve 54 is disposed such that the added urea water reaches the SCR catalyst 52 even in the state where exhaust gas does not flow through the exhaust passage 5. Accordingly, even when addition of the urea water from the urea water addition valve 54 is executed after operation stop of the internal combustion engine 1, ammonia can still be supplied to the SCR catalyst 52. As a result, the ammonia is adsorbed onto the SCR catalyst 52 after operation stop of the internal combustion engine 1. Then, immediately after the restart of the internal combustion engine 1, the ammonia adsorbed onto the SCR catalyst 52 is used for reduction of NOx in the SCR catalyst 52. This makes it possible to enhance the NOx purification rate in the SCR catalyst 52 immediately after restart of the internal combustion engine.

However, as described in the foregoing, in the present embodiment, the filter regeneration treatment is interrupted when operation of the internal combustion engine 1 is stopped during execution of the filter regeneration treatment. Then, when the internal combustion engine 1 is restarted, the filter regeneration treatment is resumed. Here, when the filter regeneration treatment is executed, the temperature of the exhaust gas flowing into the exhaust gas control apparatus 60 increases. Accordingly, not only the temperature of the filter 51 but also the temperature of the SCR catalyst 52 inevitably increase. Therefore, when the filter regeneration treatment is resumed with the restart of the internal combustion engine 1, the temperature of the SCR catalyst 52 rapidly increases immediately after the start of the internal combustion engine 1, so that the temperature of the SCR catalyst 52 can become higher than that in normal time (i.e., the time when the filter regeneration treatment is not executed).

When the temperature of the SCR catalyst 52 is high, the maximum quantity (saturated adsorption) of ammonia which can be adsorbed onto the SCR catalyst 52 becomes less than that at the time when the temperature of the SCR catalyst 52 is low. Accordingly, when the temperature of the SCR catalyst 52 increases in the state where ammonia is adsorbed onto the SCR catalyst 52 and thereby the saturated adsorption becomes less than the quantity of ammonia adsorbed onto the SCR catalyst 52, part of adsorbed ammonia desorbs from the SCR catalyst 52.

Therefore, when the filter regeneration treatment is resumed after the restart of the internal combustion engine 1 in the state where the ammonia is adsorbed onto the SCR catalyst 52 due to execution of addition of urea water from the urea water addition valve 54 after the stop of the internal combustion engine 1 as described before, the temperature of the SCR catalyst 52 increases with the restart of the filter regeneration treatment, so that the ammonia may be desorbed from the SCR catalyst 52 and discharged into the atmosphere without being used for reduction of NOx. Accordingly, in the present embodiment, when operation of the internal combustion engine 1 is stopped during execution of the filter regeneration treatment, i.e., when the filter regeneration treatment is interrupted in connection to the operation stop of the internal combustion engine 1, addition of the urea water from the urea water addition valve 54 is not executed after the operation stop of the internal combustion engine 1.

Figure 3:
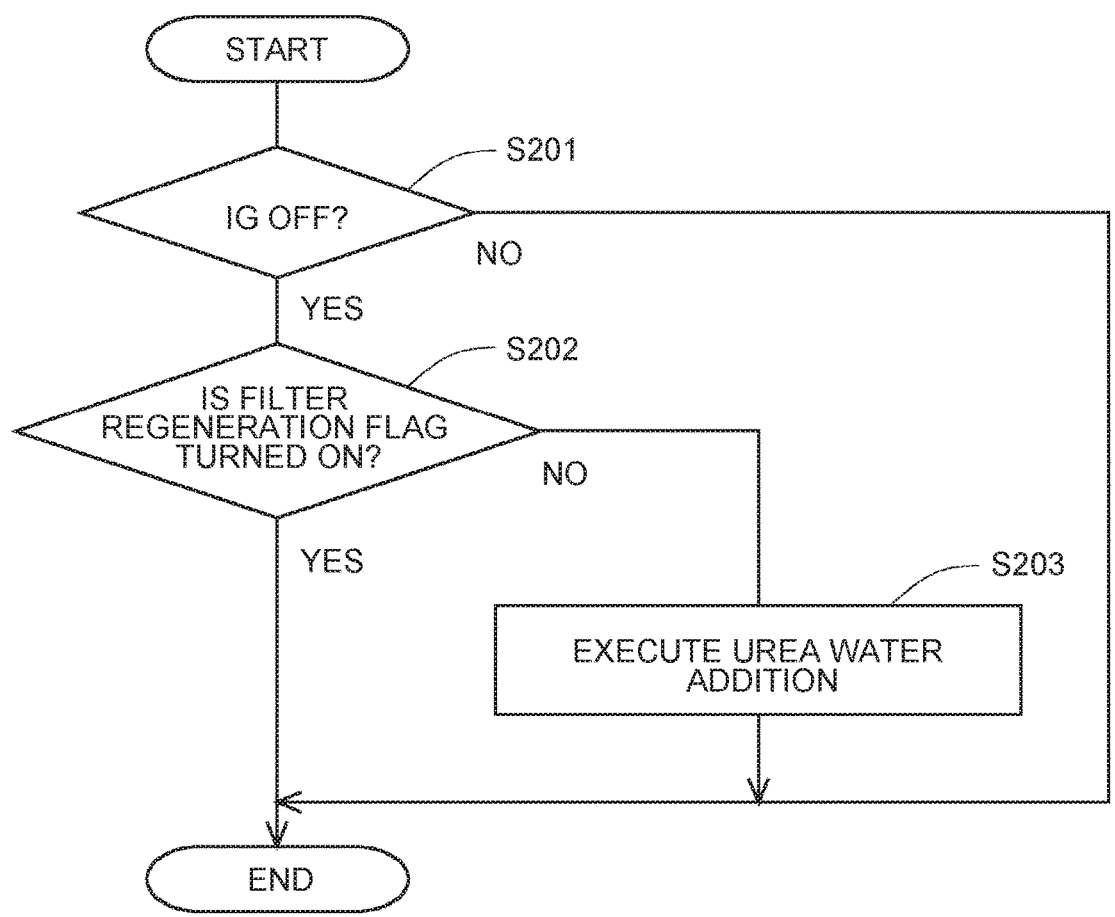
FIG. 3 is a flowchart illustrating a flow of urea water addition control after operation stop of the internal combustion engine according to the first embodiment.

Here, a description is given of the flow of the urea water addition control after operation stop of the internal combustion engine 1 according to the present embodiment with reference to FIG. 3. FIG. 3 is a flowchart illustrating the flow executed at the time of operation stop of the internal combustion engine 1. The flow is prestored in the ECU 10 and executed by the ECU 10.

In S201 of the flow, it is determined whether or not the ignition switch 6 is turned OFF (IG OFF), i.e., whether or not operation of the internal combustion engine 1 is stopped. When negative determination is made in S201, execution of the flow is temporarily ended. When positive determination is made in S201, then it is determined in S202 whether or not the filter regeneration flag stored in the ECU 10 is turned ON. When negative determination is made in S202, i.e., when the filter regeneration flag stored in the ECU 10 is turned OFF, it can be determined that operation of the internal combustion engine 1 is stopped while the filter regeneration treatment is not executed. In this case, in subsequent S203, addition of the urea water from the urea water addition valve 54 is executed. Addition of urea water from the urea water addition valve 54 at this time (i.e., addition of urea water after the operation stop of the internal combustion engine 1) is executed if the temperature of the SCR catalyst 52 is within a temperature range where urea can be hydrolyzed and ammonia generated by the hydrolysis can be adsorbed onto the SCR catalyst 52. Then, execution of the flow is ended. On the contrary, when positive determination is made in S202, it can be determined that operation of the internal combustion engine 1 is stopped during execution of the filter regeneration treatment, and the filter regeneration treatment is interrupted due to the operation stop of the internal combustion engine 1. In this case, execution of the flow is ended, without executing addition of the urea water from the urea water addition valve 54.

According to the flow illustrated in FIG. 3, in the case where operation of the internal combustion engine 1 is stopped while the filter regeneration treatment is not executed, addition of the urea water from the urea water addition valve 54 is executed after the operation stop of the internal combustion engine 1. As a result, ammonia is adsorbed onto the SCR catalyst after the operation stop of the internal combustion engine 1. This makes it possible to enhance the NOx purification rate in the SCR catalyst 52 immediately after start of the internal combustion engine 1. In the case where operation of the internal combustion engine 1 is stopped during execution of the filter regeneration treatment, addition of the urea water from the urea water addition valve 54 is not executed after the operation stop of the internal combustion engine 1. In this case, ammonia is not adsorbed onto the SCR catalyst after operation stop of the internal combustion engine 1. Therefore, it becomes possible to reduce the quantity of ammonia desorbed from the SCR catalyst 52 when the temperature of the SCR catalyst 52 rapidly increases due to resumption of the temperature increase treatment immediately after start of the internal combustion engine 1. This makes it possible to reduce the quantity of ammonia discharged into the atmosphere immediately after start of the internal combustion engine 1.

In the present embodiment, "the addition control unit" is implemented by the ECU 10 executing the flow illustrated in FIG. 3.

Time Chart

Figure 4:
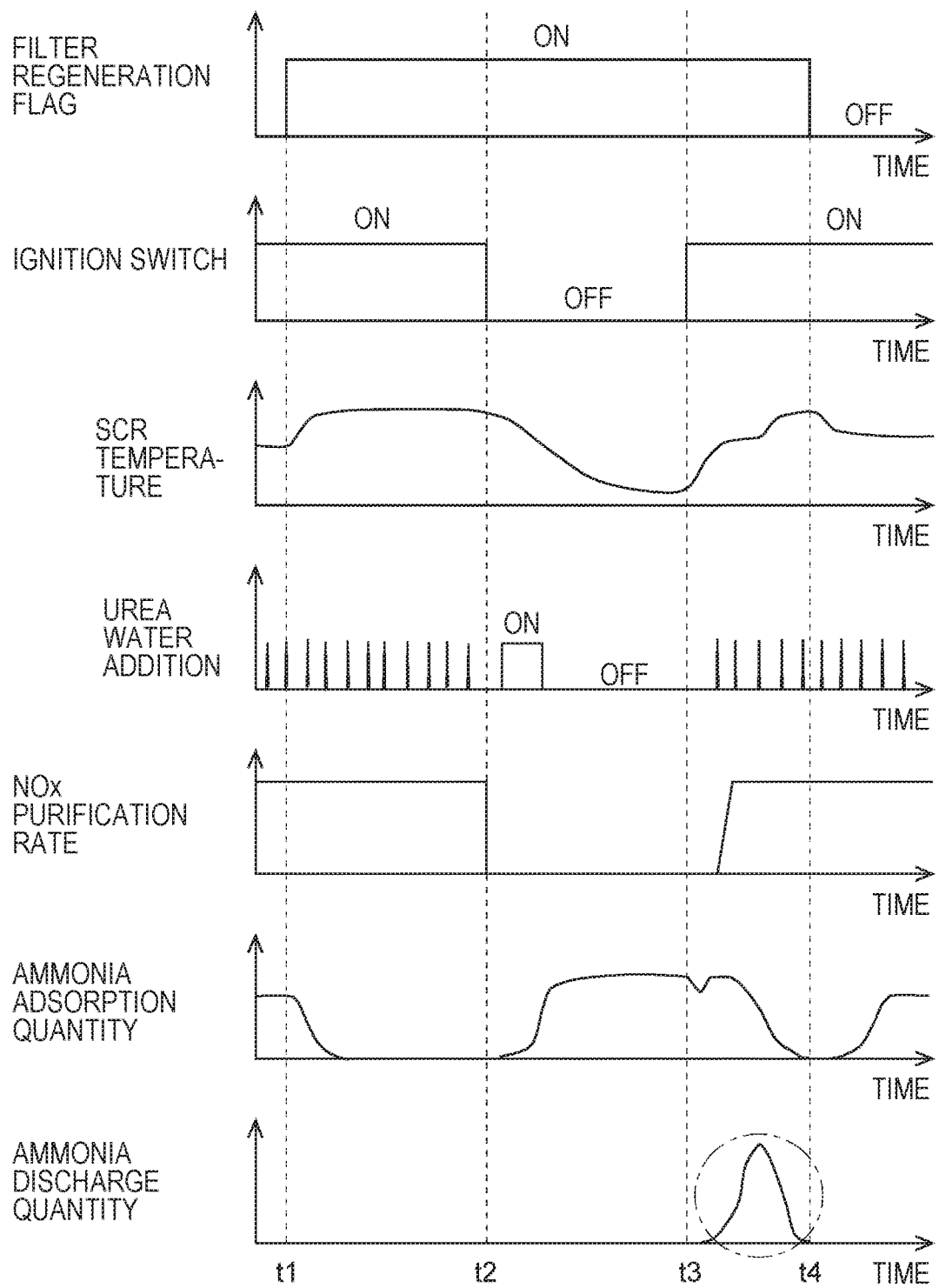
FIG. 4 illustrates temporal development in a filter regeneration flag, an ignition switch, SCR temperature, quantity of urea water added from a urea water addition valve, a NOx purification rate in an SCR catalyst, quantity of ammonia adsorbed onto the SCR catalyst, and quantity of ammonia discharged into the atmosphere in the case where conventional urea water addition control is performed at the time of operation stop and restart of the internal combustion engine.
Figure 5:
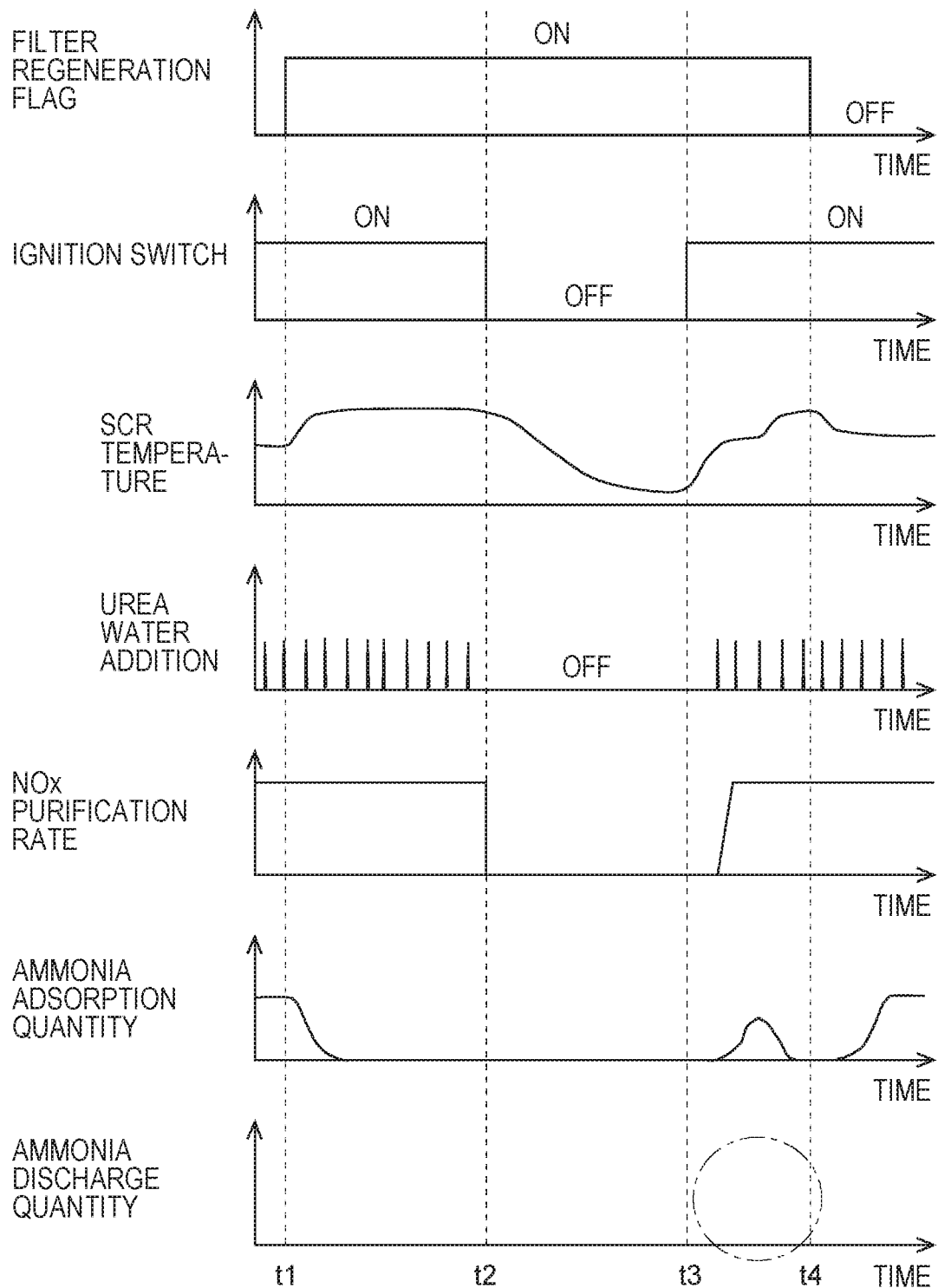
FIG. 5 illustrates temporal development in a filter regeneration flag, an ignition switch, SCR temperature, quantity of urea water added from a urea water addition valve, a NOx purification rate in an SCR catalyst, quantity of ammonia adsorbed onto the SCR catalyst, and quantity of ammonia discharged into the atmosphere in the case where the urea water addition control according to the first embodiment is performed at the time of operation stop and restart of the internal combustion engine.

FIGS. 4 and 5 illustrate temporal development in the filter regeneration flag, the ignition switch 6, the SCR temperature, the quantity of urea water added from the urea water addition valve 54, the NOx purification rate in the SCR catalyst 52, the quantity of ammonia adsorbed onto the SCR catalyst 52, and the quantity of ammonia discharged into the atmosphere at the time of operation stop and restart of the internal combustion engine 1. FIG. 4 illustrates transition of each value at the time of performing conventional urea water addition control. FIG. 5 illustrates transition of each value at the time of performing urea water addition control according to the present embodiment.

In FIGS. 4 and 5, at time t1, the filter regeneration flag is turned ON and execution of the filter regeneration treatment is started. With execution of the filter regeneration treatment, the SCR temperature increases. At time t2, the ignition switch 6 is turned OFF and operation of the internal combustion engine 1 is stopped. Although the filter regeneration treatment is stopped at this time, the filter regeneration flag is maintained to be turned ON. When operation of the internal combustion engine 1 is stopped at time t2, the SCR temperature gradually falls. Then, at time t3, the ignition switch 6 is turned ON and the internal combustion engine 1 is restarted. Since the filter regeneration flag is turned ON at this time, the filter regeneration treatment is also resumed. With the restart of this internal combustion engine 1 and the resumption of the filter regeneration treatment, the SCR temperature increases. As illustrated in FIG. 4, even when ammonia is adsorbed onto the SCR catalyst 52 at the moment when the internal combustion engine 1 is restarted (time t3), NOx is not reduced in the SCR catalyst 52 until the SCR temperature reaches an active temperature. At time t4, the filter regeneration flag is turned OFF and the filter regeneration treatment is stopped. With the stop of the filter regeneration treatment, the SCR temperature decreases.

In both FIGS. 4 and 5, addition of urea water from the urea water addition valve 54 during operation of the internal combustion engine 1 is similarly controlled. Here, since the SCR temperature rises during execution of the filter regeneration treatment, ammonia is hard to be adsorbed onto the SCR catalyst 52. Accordingly, during execution of the filter regeneration treatment, the addition quantity of urea water from the urea water addition valve 54 is controlled so that the quantity of ammonia generated by hydrolysis of urea corresponds to the quantity of NOx flowing into the SCR catalyst 52.

In the case where conventional urea water addition control is performed, addition of urea water from the urea water addition valve 54 is executed during operation stop of the internal combustion engine 1 after the internal combustion engine 1 is stopped (after time t2) as illustrated in FIG. 4. As a result, the quantity of ammonia adsorbed onto the SCR catalyst 52 increases during the operation stop of the internal combustion engine 1. However, when the internal combustion engine 1 is restarted at time t3, the filter regeneration treatment is also resumed, so that the SCR temperature rapidly increases. As a result, the ammonia adsorbed onto the SCR catalyst 52 desorbs. Accordingly, as illustrated in areas surrounded with a dashed dotted line in FIG. 4, the quantity of ammonia discharged into the atmosphere increases immediately after start of the internal combustion engine 1.

In contrast, when the urea water addition control according to the present embodiment is performed, addition of urea water from the urea water addition valve 54 is not executed during operation stop of the internal combustion engine 1 after operation of the internal combustion engine 1 is stopped (after time t2) as illustrated in FIG. 5. Therefore, ammonia is not newly adsorbed onto the SCR catalyst 52 during operation stop of the internal combustion engine 1. Accordingly, even when the SCR temperature rapidly increases due to resumption of the filter regeneration treatment with the restart of the internal combustion engine 1, the quantity of ammonia desorbed from the SCR catalyst 52 can be controlled. Therefore, as illustrated in areas surrounded with a dashed dotted line in FIG. 5, it becomes possible to reduce the quantity of ammonia discharged into the atmosphere immediately after start of the internal combustion engine 1.

Modified Example

Figure 6:
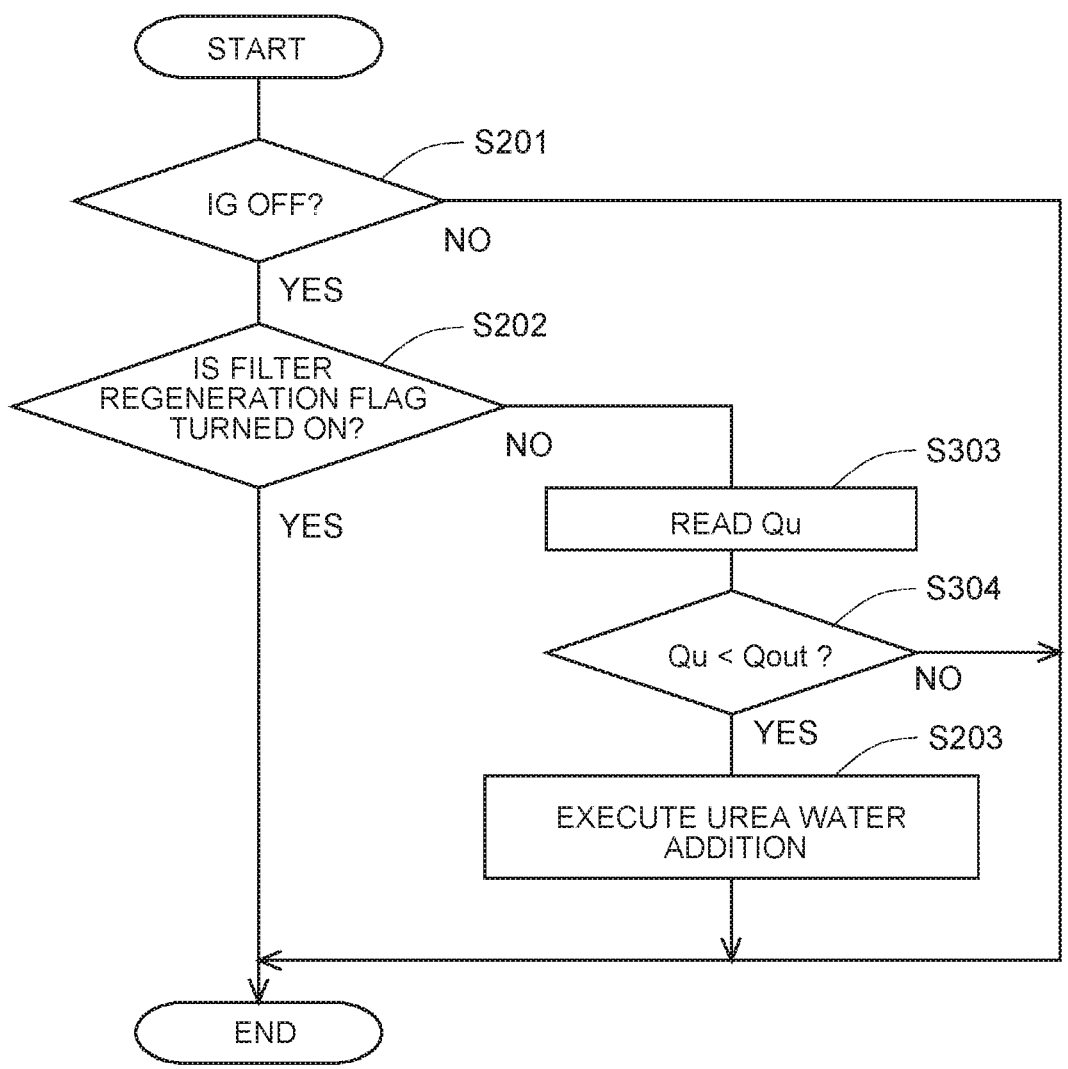
FIG. 6 is a flowchart illustrating a flow of the urea water addition control after operation stop of the internal combustion engine according to a modified example of the first embodiment.

Here, a description is given of the flow of urea water addition control after operation stop of the internal combustion engine 1 according to a modified example of the first embodiment with reference to FIG. 6. FIG. 6 is a flowchart illustrating the flow executed at the time of operation stop of the internal combustion engine 1. The flow is prestored in the ECU 10 and executed by the ECU 10. The processing of S201 to S203 in the flow is the same as the processing of S201 to S203 in the flow illustrated in FIG. 3. Accordingly, the description of the processing in these steps is omitted.

Even when operation of the internal combustion engine 1 is stopped while the filter regeneration treatment is not executed, it is not necessary to newly adsorb ammonia onto the SCR catalyst 52 after the operation stop of the internal combustion engine 1 if a sufficient quantity of ammonia is already adsorbed onto the SCR catalyst 52 at the moment when the operation of the internal combustion engine 1 is stopped. That is, it is not necessary to add urea water from the urea water addition valve 54 after the operation stop of the internal combustion engine 1.

Accordingly, in this flow, when negative determination is made in S202, i.e., when operation of the internal combustion engine 1 is stopped while the filter regeneration treatment is not executed, then processing of S303 is executed. As described in the foregoing, in the present embodiment, the ECU 10 periodically computes the quantity of ammonia adsorbed onto the SCR catalyst 52 during operation of the internal combustion engine 1. The quantity of ammonia adsorbed onto the SCR catalyst 52 stored in the ECU 10 is updated for each computation. In S303, an ammonia adsorption quantity Qu stored in the ECU 10, i.e., an ammonia adsorption quantity Qu at the moment when the operation of the internal combustion engine 1 is stopped, is read.

Next, in S304, it is determined whether or not the ammonia adsorption quantity Qu read in S303 is less than a specified target adsorption quantity Qut. Here, the target adsorption quantity Qut may be defined as an adsorption quantity of ammonia considered to be necessary for sufficient reduction of NOx in the SCR catalyst 52 immediately after restart of the internal combustion engine 1. Such a target adsorption quantity Qut is preset based on an experiment and the like, and is stored in the ECU 10. When positive determination is made in S304, then processing of S203 is executed. At this time, a total addition quantity of urea water from the urea water addition valve 54 may be determined based on a difference between the ammonia adsorption quantity Qu and the target adsorption quantity Qut read in S303. That is, the total addition quantity of the urea water from the urea water addition valve 54 may be determined such that the quantity of ammonia adsorbed onto the SCR catalyst 52 becomes equal to the target adsorption quantity Qut. When negative determination is made in S304, i.e., the ammonia adsorption quantity Qu read in S303 is equal to or more than the target adsorption quantity Qut, it can be determined that a sufficient quantity of ammonia is already adsorbed onto the SCR catalyst 52. Accordingly, in this case, execution of the flow is ended without execution of addition of urea water from the urea water addition valve 54.

According to the urea water addition control as illustrated in the flow in FIG. 6, when operation of the internal combustion engine 1 is stopped while the filter regeneration treatment is not executed, addition of the urea water from the urea water addition valve 54 after the operation stop of the internal combustion engine 1 is executed only if the ammonia adsorption quantity Qu at the moment when the operation of the internal combustion engine 1 is stopped is less than the target adsorption quantity Qut. As a result, it becomes possible to suppress unnecessary addition of urea water from the urea water addition valve 54. In the present modified example, "the addition control unit" is implemented by the ECU 10 executing the flow illustrated in FIG. 6.

Second Embodiment

Figure 7:
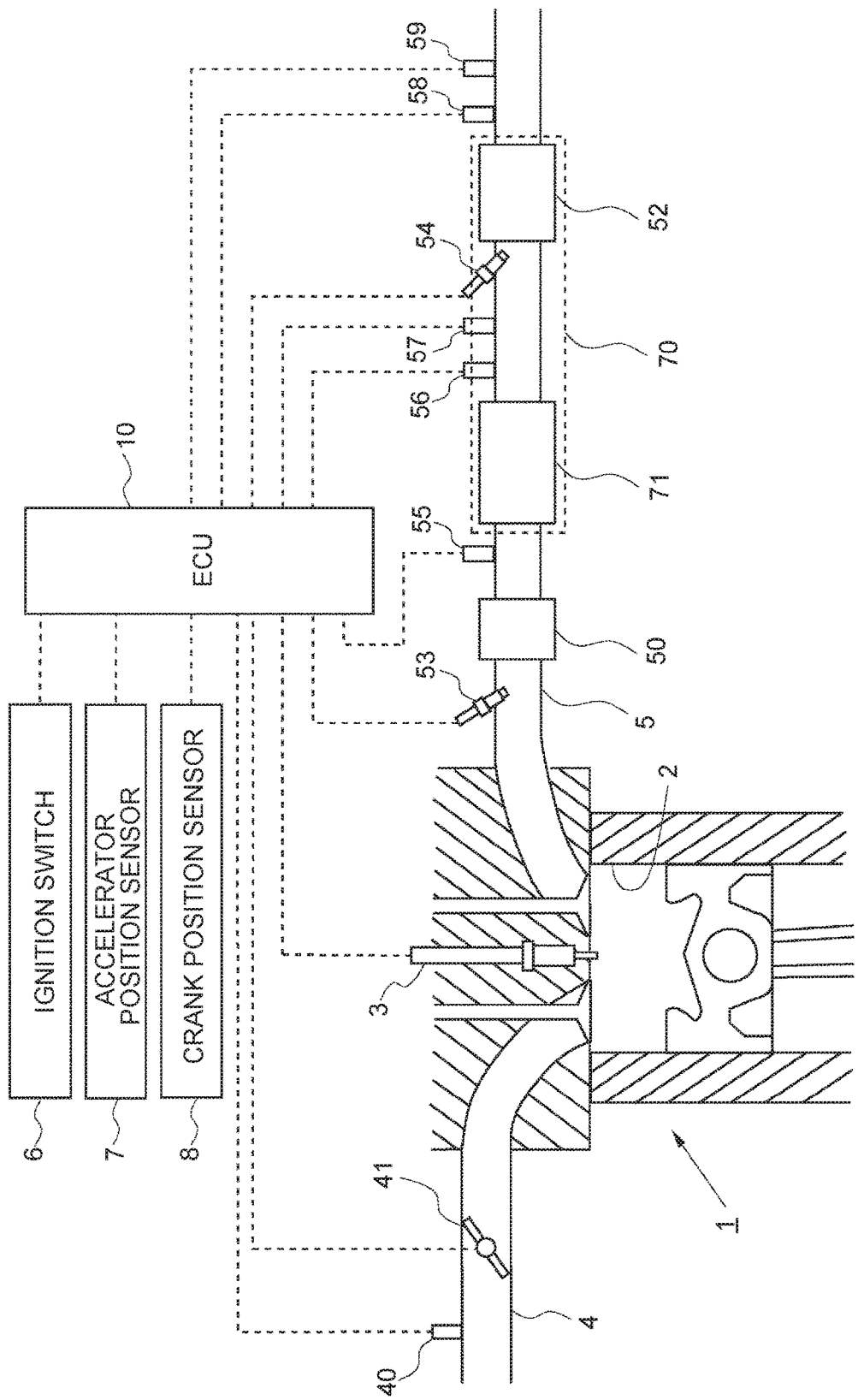
FIG. 7 illustrates a schematic configuration of an internal combustion engine and an intake and exhaust system thereof according to a second embodiment.

FIG. 7 illustrates a schematic configuration of an internal combustion engine and an intake and exhaust system thereof according to the embodiment. In the present embodiment, the filter 51 in the first embodiment is replaced with an occlusion reduction NOx catalyst 71 (which may also be referred to as "NSR catalyst 71" below) provided downstream from the oxidation catalyst 50 and upstream from the upstream temperature sensor 56 in the exhaust passage 5. The NSR catalyst 71 has a function to occlude NOx in exhaust gas when an air-fuel ratio of the circumferential atmosphere is a lean air-fuel ratio and to reduce occluded NOx when the air-fuel ratio in the circumferential atmosphere is a rich air-fuel ratio. Here, the term "occlusion" includes a meaning of temporary "adsorption" of NOx onto the NSR catalyst 71. Hereinafter, the NSR catalyst 71 and the SCR catalyst 52 may integrally be referred to as an exhaust gas control apparatus 70. In the present embodiment, the ECU 10 also estimates the temperature of the NSR catalyst 71 (which may also be referred to as "NSR temperature") based on an output value of the upstream temperature sensor 56. Other configurational aspects are similar to those of the first embodiment illustrated in FIG. 1.

In the present embodiment, the NSR catalyst 71 corresponds to "the exhaust gas control element", and the SCR catalyst 52 corresponds to "the selective reduction NOx catalyst." In the present embodiment, the exhaust gas control apparatus 70 constituted of the NSR catalyst 71 and the SCR catalyst 52 corresponds to "the exhaust gas control apparatus."

SOx Poisoning Recovery Control

The NSR catalyst 71 occludes not only NOx in exhaust gas but also SOx in exhaust gas. As the occlusion quantity (which may also simply be referred to as "SOx occlusion quantity") in the NSR catalyst 71 increases, NOx occlusion capacity of the NSR catalyst 71 deteriorates. Accordingly, in the present embodiment, the ECU 10 repeatedly computes the quantity of SOx occluded in the NSR catalyst 71 at predetermined periods during operation of the internal combustion engine 1. In this computation, the quantity of SOx discharged from the internal combustion engine 1 is integrated to calculate a current SOx occlusion quantity. The quantity of SOx discharged from the internal combustion engine 1 is calculable based on a fuel injection quantity in the internal combustion engine 1 and the like.

In the present embodiment, when the quantity of SOx occluded in the NSR catalyst 71 calculated as described before reaches a specified occlusion quantity, the ECU 10 executes SOx poisoning recovery treatment. The SOx poisoning recovery treatment is implemented by intermittent addition of fuel from the fuel addition valve 53. When fuel is intermittently added from the fuel addition valve 53, the temperature of the exhaust gas flowing into the NSR catalyst 71 increases so that the NSR temperature increases, while the air-fuel ratio of the atmosphere around the NSR catalyst 71 intermittently decreases. In this case, when the NSR temperature becomes a specified SOx poisoning recovery temperature, and the air-fuel ratio of the atmosphere around the NSR catalyst 71 decreases, the quantity of fuel added from the fuel addition valve 53 is regulated so that the air-fuel ratio becomes equal to a specified SOx poisoning recovery air-fuel ratio that is a rich air fuel ratio. Here, the SOx poisoning recovery temperature is a temperature in the range where the SOx occluded in the NSR catalyst 71 can be reduced and overheating of the NSR catalyst 71 can be suppressed. The SOx poisoning recovery air-fuel ratio is an air-fuel ratio which can reduce SOx occluded in the NSR catalyst 71. Such an SOx poisoning recovery temperature and an SOx poisoning recovery air-fuel ratio are preset based on an experiment and the like, and are stored in the ECU 10. When the temperature of the NSR catalyst 71 is increased to the SOx poisoning recovery temperature and the air-fuel ratio of the atmosphere around the NSR catalyst 71 decreases to the SOx poisoning recovery air-fuel ratio, the SOx occluded in the NSR catalyst 71 is reduced.

When a specified recovery treatment period elapses after execution of SOx poisoning recovery treatment is started, the ECU 10 stops the SOx poisoning recovery treatment. Here, the recovery treatment period is a period in which the SOx occluded in the NSR catalyst 71 can sufficiently be reduced (i.e., a period in which the NOx occlusion function of the NSR catalyst 71 can sufficiently be recovered). Such a recovery treatment period is preset based on an experiment and the like and is stored in the ECU 10. The SOx poisoning recovery treatment may be implemented not by fuel addition from the fuel addition valve 53 but by sub fuel injection (post injection) from the fuel injection valve 3 performed at the timing subsequent to main fuel injection in the internal combustion engine 1.

In some cases, operation of the internal combustion engine 1 is stopped during execution of the SOx poisoning recovery treatment. In such a case, the ECU 10 interrupts the SOx poisoning recovery treatment. That is, the SOx poisoning recovery treatment is stopped before the recovery treatment period elapses after the start of execution of the SOx poisoning recovery treatment. In such a case, when the internal combustion engine 1 is restarted, the ECU 10 resumes the SOx poisoning recovery treatment. That is, the SOx poisoning recovery treatment is executed even in the state where the SOx occlusion quantity in the NSR catalyst 71 is less than the specified occlusion quantity. Also in such a case, the SOx poisoning recovery treatment is stopped when a value obtained by integrating execution periods of the SOx poisoning recovery treatment (i.e., a total value of an execution period of the SOx poisoning recovery treatment before operation stop of the internal combustion engine 1 and an execution period of the SOx poisoning recovery treatment after restart of the internal combustion engine 1) reaches the recovery treatment period.

Here, the flow of the SOx poisoning recovery treatment according to the present embodiment will be described based on the flowchart illustrated in FIG. 8. The flow is prestored in the ECU 10, and is executed by the ECU 10 during operation of the internal combustion engine 1 (including start time and stop time of the internal combustion engine 1).

In this flow, first, it is determined in S401 whether or not an SOx poisoning recovery flag stored in the ECU 10 is turned OFF. Here, the SOx poisoning recover flag is turned ON when a condition to execute the SOx poisoning recovery treatment is satisfied, and is turned OFF when the condition to execute the SOx poisoning recovery treatment is not satisfied. As described in the foregoing, when operation of the internal combustion engine 1 is stopped during execution of the SOx poisoning recovery treatment, the SOx poisoning recovery treatment is interrupted. However, in this case, the SOx poisoning recovery flag stored in the ECU 10 is maintained to be turned ON. Therefore, in the case where positive determination is made in S101 when the flow is executed for the first time at the start of the internal combustion engine 1, i.e., when the flag stored in the ECU 10 is OFF, it can be determined that the SOx poisoning recovery treatment was not executed when operation of the internal combustion engine 1 was previously stopped. In this case, processing of S402 is executed next.

Here, as described in the foregoing, in the present embodiment, the ECU 10 periodically computes the quantity of SOx occluded in the NSR catalyst 71 during operation of the internal combustion engine 1. The SOx occlusion quantity occluded in the ECU 10 is updated for each computation. In S402, a SOx occlusion quantity Qsox in the NSR catalyst 71 stored in the ECU 10, i.e., a current SOx occlusion quantity Qsox, is read.

Next, in S403, it is determined whether or not the SOx occlusion quantity Qsox read in S402 is equal to or more than a specified occlusion quantity Qsox0 that is a threshold for start of execution of the SOx poisoning recovery treatment. When positive determination is made in S403, then in S404, the SOx poisoning recovery flag stored in the ECU 10 is turned ON. Then, in S405, the SOx poisoning recovery treatment is executed. That is, intermittent fuel addition from the fuel addition valve 53 is executed, so that the NSR temperature is controlled to be the SOx poisoning recovery temperature.

In the case where negative determination is made in S401 when the flow is executed for the first time at the start of the internal combustion engine 1, i.e., when the SOx poisoning recover flag stored in the ECU 10 is turned ON, it can be determined that the SOx poisoning recovery treatment was interrupted when operation of the internal combustion engine 1 was previously stopped. In this case, processing of S405 is executed without going through processing of S402 to S404. That is, even in the state where the SOx occlusion quantity Qsox at the current moment is less than the specified occlusion quantity Qsox0, the SOx poisoning recovery treatment is still resumed.

After processing of S405, processing of S406 is executed. In S406, it is determined whether or not a recovery treatment period dt0 elapsed after start of execution of the SOx poisoning recovery treatment. Here, assume the case where the processing of S405 is executed as a result of negative determination made in S401, i.e., the case where the SOx poisoning recovery treatment is resumed because the SOx poisoning recovery flag stored in the ECU 10 is set to ON when the flow is executed for the first time at the start of the internal combustion engine 1. In this case, it is determined in S406 whether or not the total value of an execution period of the SOx poisoning recovery treatment before operation stop of the internal combustion engine 1 and an execution period of the SOx poisoning recovery treatment after restart of the internal combustion engine 1 amounts to the recovery treatment period dt0. When positive determination is made in S406, then in S407, the SOx poisoning recover flag stored in the ECU 10 is turned OFF. Then, in S408, the SOx poisoning recover treatment is stopped. That is, intermittent fuel addition from the fuel addition valve 53 is stopped. Then, execution of the flow is temporarily ended.

On the contrary, when negative determination is made in S406, i.e., when the execution period of the SOx poisoning recovery treatment does not yet reach the recovery treatment period dt0, then processing of S409 is executed. In S409, it is determined whether or not the ignition switch 6 is turned OFF (IG OFF), i.e., whether or not operation of the internal combustion engine 1 is stopped. When negative determination is made in S409, i.e., when the operation of the internal combustion engine 1 continues, then the processing of S405 to S406 is executed again. That is, execution of the SOx poisoning recovery treatment is continued. Meanwhile, when positive determination is made in S409, then processing of S408 is executed. That is, the SOx poisoning recovery treatment is interrupted at the stage where the execution period of the SOx poisoning recovery treatment is shorter than the recovery treatment period dt0. In this case, as described before, the SOx poisoning recover flag stored in the ECU 10 is maintained to be turned ON. Then, execution of the flow is ended.

When negative determination is made in S403, i.e., when the SOx occlusion quantity Qsox in the NSR catalyst 71 does not yet reach the specified occlusion quantity Qsox0 during operation of the internal combustion engine 1, then in S410, the SOx poisoning recovery flag stored in the ECU 10 is maintained to be turned OFF. Then, execution of the flow is temporarily ended. In this case, when the flow is executed next time, positive determination will be made in S401.

Figure 8:
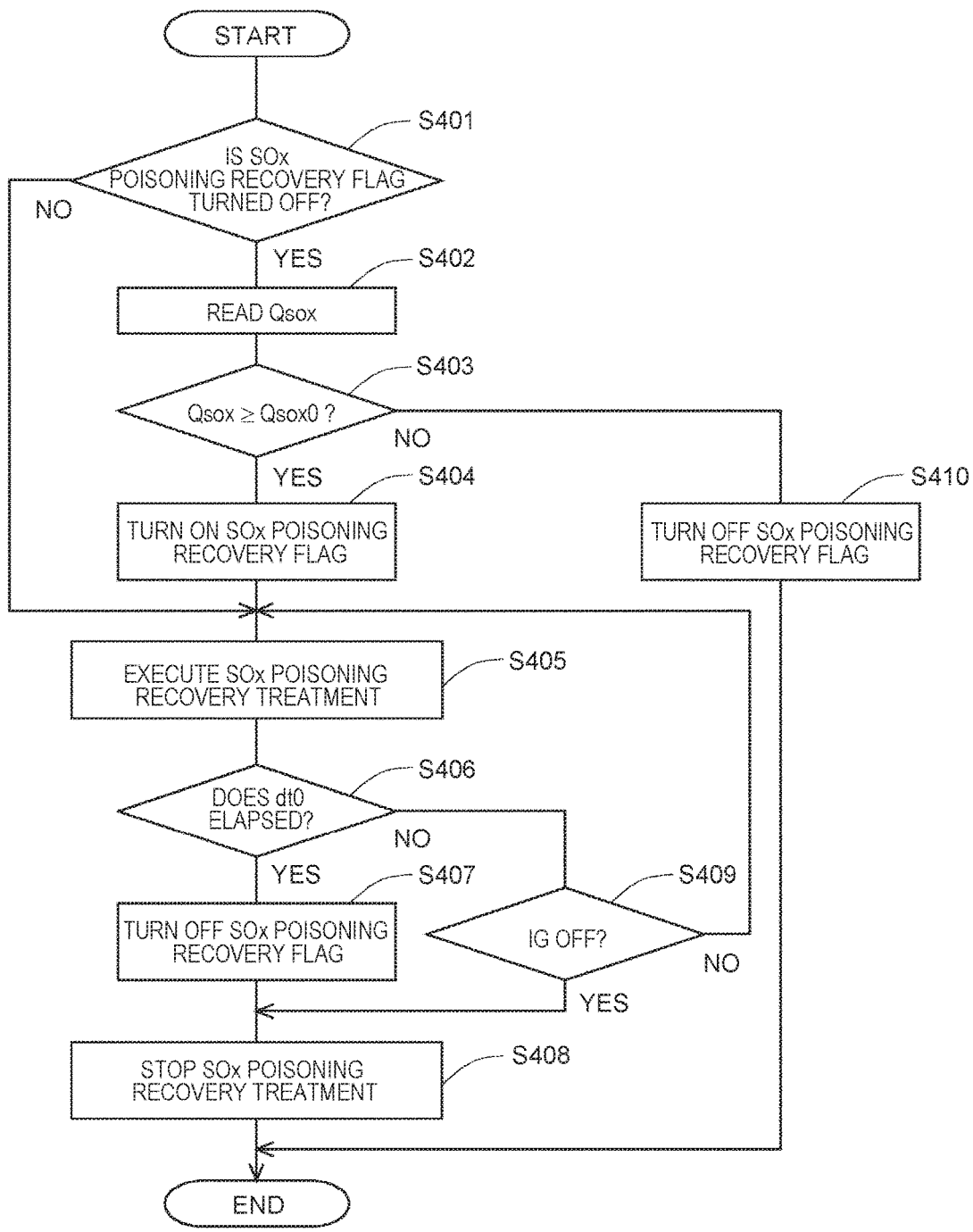
FIG. 8 is a flowchart illustrating a flow of SOx poisoning recovery treatment according to the second embodiment.

According to the flow illustrated in FIG. 8, when operation of the internal combustion engine 1 is stopped during execution of the SOx poisoning recovery treatment, the SOx poisoning recovery treatment is interrupted, and then when the internal combustion engine 1 is restarted, the SOx poisoning recovery treatment is resumed.

In the present embodiment, the SOx poisoning recovery treatment corresponds to "the temperature increase treatment." In the present embodiment, "the temperature increase treatment unit" is implemented by the ECU 10 executing the flow illustrated in FIG. 8.

Urea Water Addition Control

A description is now given of the urea water addition control according to the present embodiment. Also in the present embodiment, urea water addition from the urea water addition valve 54 during operation of the internal combustion engine 1 is controlled in a similar manner as in the first embodiment. As described in the foregoing, in present embodiment, when operation of the internal combustion engine 1 is stopped during execution of the SOx poisoning recovery treatment, the SOx poisoning recovery treatment is interrupted. Then, when the internal combustion engine 1 is restarted, the SOx poisoning recovery treatment is resumed. Here, when the SOx poisoning recovery treatment is executed, the temperature of the exhaust gas flowing into the exhaust gas control apparatus 70 increases. Accordingly, not only the temperature of the NSR catalyst 71 but also the temperature of the SCR catalyst 52 inevitably increase. Therefore, when SOx poisoning recovery treatment is resumed with the restart of the internal combustion engine 1 as in the case where the filter regeneration treatment is resumed in the first embodiment, the temperature of the SCR catalyst 52 rapidly increases immediately after the start of the internal combustion engine 1. As a result, the temperature of the SCR catalyst 52 can become higher than that in normal time (i.e., the time when the SOx poisoning recovery treatment is not executed).

Accordingly, when the SOx poisoning recovery treatment is resumed after restart of the internal combustion engine 1 in the state where ammonia is adsorbed onto the SCR catalyst 52 due to execution of addition of urea water from the urea water addition valve 54 after the stop of the internal combustion engine 1, the temperature of the SCR catalyst 52 rapidly increases with the restart of the SOx poisoning recovery treatment, so that the ammonia may be desorbed from the SCR catalyst 52 and discharged into the atmosphere without being used for reduction of NOx. Accordingly, in the present embodiment, when operation of the internal combustion engine 1 is stopped during execution of the SOx poisoning recovery treatment, i.e., when the SOx poisoning recovery treatment is interrupted with operation stop of the internal combustion engine 1, addition of the urea water from the urea water addition valve 54 is not executed after the operation stop of the internal combustion engine 1.

Figure 9:
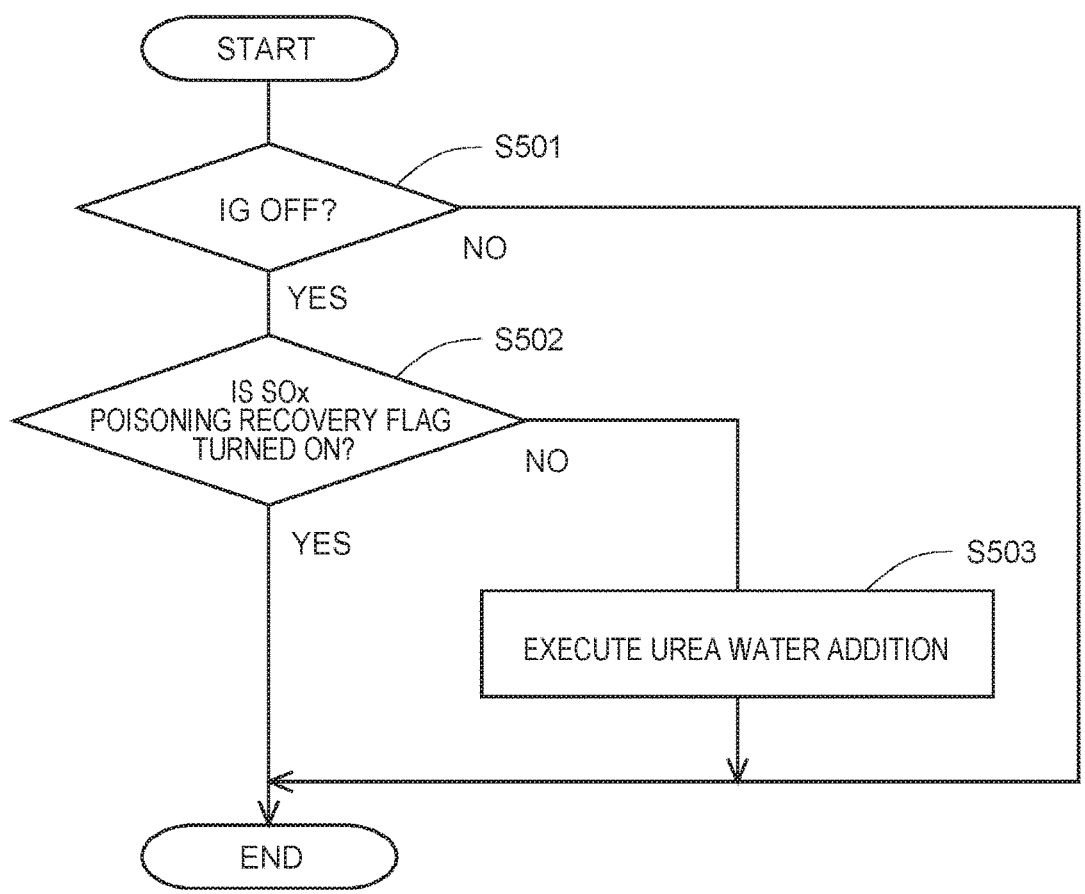
FIG. 9 is a flowchart illustrating a flow of the urea water addition control after operation stop of the internal combustion engine according to the second embodiment.

Here, a description is given of the flow of the urea water addition control after operation stop of the internal combustion engine 1 according to the present embodiment with reference to FIG. 9. FIG. 9 is a flowchart illustrating the flow executed at the time of operation stop of the internal combustion engine 1. The flow is prestored in the ECU 10 and executed by the ECU 10.

In S501 of the flow, it is determined whether or not the ignition switch 6 is turned OFF (IG OFF), i.e., whether or not operation of the internal combustion engine 1 is stopped. When negative determination is made in S501, execution of the flow is temporarily ended. When positive determination is made in S501, then it is determined in S502 whether or not the SOx poisoning recovery flag stored in the ECU 10 is turned ON. When negative determination is made in S502, i.e., when the SOx poisoning recovery flag stored in the ECU 10 is turned OFF, it can be determined that operation of the internal combustion engine 1 is stopped while the SOx poisoning recovery is not executed. In this case, in subsequent S503, addition of the urea water from the urea water addition valve 54 is executed. Addition of urea water from the urea water addition valve 54 at this time (i.e., addition of urea water after operation stop of the internal combustion engine 1) is executed if the temperature of the SCR catalyst 52 is within a temperature range where urea can be hydrolyzed and ammonia generated by the hydrolysis can be adsorbed onto the SCR catalyst 52. Then, execution of the flow is ended. On the contrary, when positive determination is made in S502, it can be determined that operation of the internal combustion engine 1 is stopped during execution of the SOx poisoning recovery treatment, and the SOx poisoning recovery treatment is interrupted due to the operation stop of the internal combustion engine 1. In this case, execution of the flow is ended, without executing addition of the urea water from the urea water addition valve 54.

According to the flow illustrated in FIG. 9, in the case where operation of the internal combustion engine 1 is stopped while the SOx poisoning recovery treatment is not executed, addition of the urea water from the urea water addition valve 54 is executed after the operation stop of the internal combustion engine 1. As a result, ammonia is adsorbed onto the SCR catalyst 52 after the operation stop of the internal combustion engine 1. This makes it possible to enhance the NOx purification rate in the SCR catalyst 52 immediately after start of the internal combustion engine 1. In the case where operation of the internal combustion engine 1 is stopped during execution of the SOx poisoning recovery treatment, addition of the urea water from the urea water addition valve 54 is not executed after the operation stop of the internal combustion engine 1. In this case, ammonia is not adsorbed onto the SCR catalyst 52 after operation stop of the internal combustion engine 1. Therefore, it becomes possible to reduce the quantity of ammonia desorbed from the SCR catalyst 52 when the temperature of the SCR catalyst 52 rapidly increases due to resumption of the SOx poisoning recovery treatment immediately after start of the internal combustion engine 1. This makes it possible to reduce the quantity of ammonia discharged into the atmosphere immediately after start of the internal combustion engine 1.

In the present embodiment, "the addition control unit" is implemented by the ECU 10 executing the flow illustrated in FIG. 9.

Modified Example

Also in the present embodiment, even in the case where operation of the internal combustion engine 1 is stopped while the SOx poisoning recovery treatment is not executed, it is not necessary to newly adsorb ammonia onto the SCR catalyst 52 after the operation stop of the internal combustion engine 1 when a sufficient quantity of ammonia is already adsorbed onto the SCR catalyst 52 at the moment when the operation of the internal combustion engine 1 is stopped. In short, it is not necessary to add urea water from the urea water addition valve 54 after the operation stop of the internal combustion engine 1.

Accordingly, in the present embodiment, in the case where operation of the internal combustion engine 1 is stopped while the SOx poisoning recovery treatment is not executed as in the modified example of the first embodiment, addition of the urea water from the urea water addition valve 54 after the operation stop of the internal combustion engine 1 may be executed only if the ammonia adsorption quantity Qu at the moment when the operation of the internal combustion engine 1 is stopped is less than the target adsorption quantity Qut. More specifically, in the case where operation of the internal combustion engine 1 is stopped while the SOx poisoning recovery treatment is not executed, addition of the urea water from the urea water addition valve 54 after the operation stop of the internal combustion engine 1 may be prohibited when the ammonia adsorption quantity Qu at the moment when the operation of the internal combustion engine 1 is stopped is equal to or more than the target adsorption quantity Qut. According to the above configuration, unnecessary addition of urea water from the urea water addition valve 54 can be suppressed as in the modified example of the first embodiment.

In each of the embodiments described in the foregoing, when the ignition switch 6 is turned OFF, operation of the internal combustion engine 1 is stopped, and when the ignition switch 6 is turned ON, the internal combustion engine 1 is started. However, the exhaust gas control system may be applied to an internal combustion engine adopting so-called automatic stop and automatic start control in which operation of the internal combustion engine is automatically stopped when a specified automatic stopping condition is satisfied, and then the internal combustion engine is restarted when a specified automatic starting condition is satisfied.

What is claimed is:

1. An exhaust gas control system for an internal combustion engine, the exhaust gas control system comprising:
   an exhaust gas control apparatus provided in an exhaust passage of the internal combustion engine, the exhaust gas control apparatus including a selective reduction NOx catalyst having a function to selectively reduce NOx in exhaust gas with ammonia as a reducing agent, and an exhaust gas control element having an exhaust gas control function different from the selective reduction NOx catalyst;
   an addition valve provided in the exhaust passage, the addition valve being configured to add one of an additive that is ammonia and a precursor of ammonia toward the selective reduction NOx catalyst; and
   an electronic control unit configured to
   i) when a specified temperature increase execution condition is satisfied, execute temperature increase treatment that increases temperature of the exhaust gas flowing into the exhaust gas control apparatus such that a temperature of the exhaust gas control element increases to a specified target temperature,
   ii) when operation of the internal combustion engine is stopped during execution of the temperature increase treatment, interrupt the temperature increase treatment, and then resume the temperature increase treatment when the internal combustion engine is restarted,
   iii) when operation of the internal combustion engine is stopped while the temperature increase treatment is not executed, execute addition of the additive from the addition valve after operation stop of the internal combustion engine, and
   iv) when operation of the internal combustion engine is stopped during execution of the temperature increase treatment, prohibit execution of addition of the additive from the addition valve after operation stop of the internal combustion engine.

2. The exhaust gas control system according to claim 1, wherein
   the electronic control unit is configured to, when operation of the internal combustion engine is stopped while the temperature increase treatment is not executed,
   i) execute addition of the additive from the addition valve after operation stop of the internal combustion engine when quantity of ammonia adsorbed onto the selective reduction NOx catalyst at a moment when operation of the internal combustion engine is stopped is smaller than a specified target adsorption quantity, and
   ii) prohibit execution of addition of the additive from the addition valve after operation stop of the internal combustion engine when the quantity of ammonia adsorbed onto the selective reduction NOx catalyst at the moment when operation of the internal combustion engine is stopped is equal to or larger than the target adsorption quantity.

3. The exhaust gas control system according to claim 1, wherein
   the exhaust gas control element is a filter having a function to collect particulates in the exhaust gas,
   the temperature increase treatment is filter regeneration treatment that oxidizes and removes the particulates accumulated on the filter, and
   the temperature increase execution condition is an execution condition of the filter regeneration treatment.

4. The exhaust gas control system according to claim 1, wherein
   the exhaust gas control element is an occlusion reduction NOx catalyst,
   the temperature increase treatment is SOx poisoning recovery treatment that recovers the occlusion reduction NOx catalyst from SOx poisoning, and
   the temperature increase execution condition is an execution condition of the SOx poisoning recovery treatment.

* * * * *